United States Patent

[11] 3,538,997

| [72] | Inventors | William C. Christine<br>Catasauqua, and<br>Joseph E. Pierce, Allentown, Pennsylvania |
|------|-----------|----------------------------------------------------------------------------------|
| [21] | Appl. No. | 773,393 |
| [22] | Filed     | Nov. 5, 1968 |
| [45] | Patented  | Nov. 10, 1970 |
| [73] | Assignee  | A.E.I. Corporation<br>Bethlehem, Pennsylvania<br>a corporation of Delaware |

[54] ENDLESS CONVEYOR FLIGHT WITH REPLACEABLE HOLDERS
4 Claims, 8 Drawing Figs.

[52] U.S. Cl. ................................................ 198/131
[51] Int. Cl. ............................................... B65g 15/00
[50] Field of Search ...................................... 198/131

[56] References Cited
UNITED STATES PATENTS
756,591    4/1904    Cramer .................... 198/131

Primary Examiner—Richard E. Aegerter
Attorney—Sherman Levy

ABSTRACT: Apparatus for use with an endless conveyor and including a plurality of replaceable holders for accommodating multiple containers used in the packaging of food products.

Patented Nov. 10, 1970
3,538,997
Sheet 1 of 2
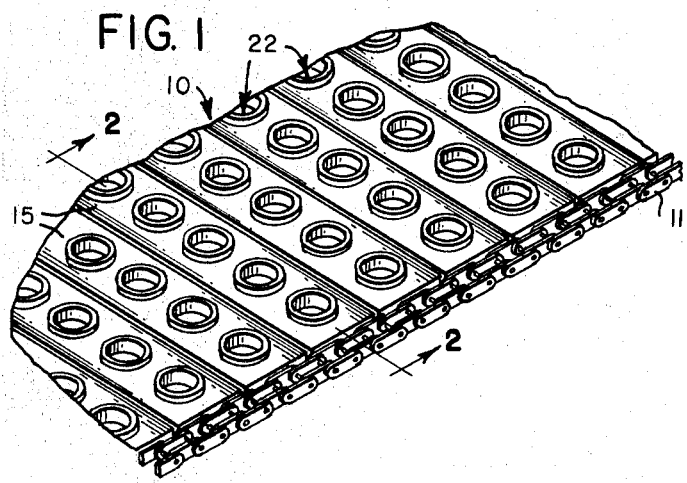
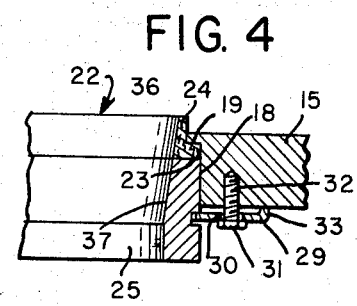
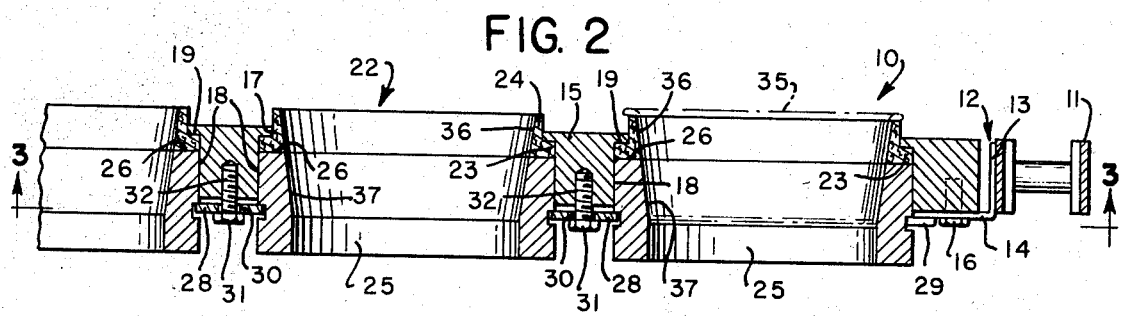
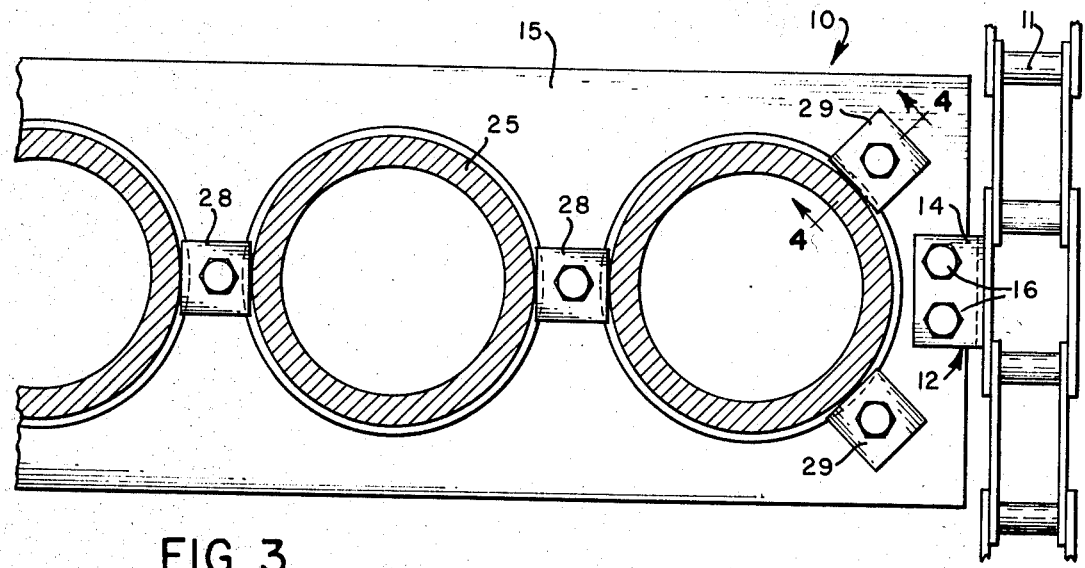
INVENTOR
WILLIAM C. CHRISTINE
JOSEPH E. PIERCE
BY *Sherman Levy*
ATTORNEY

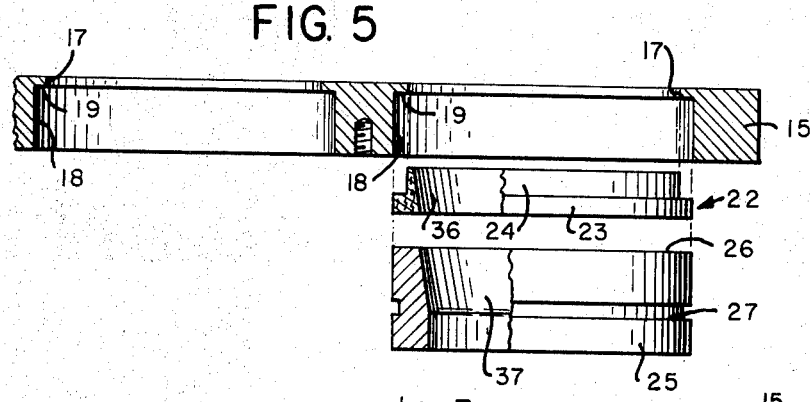
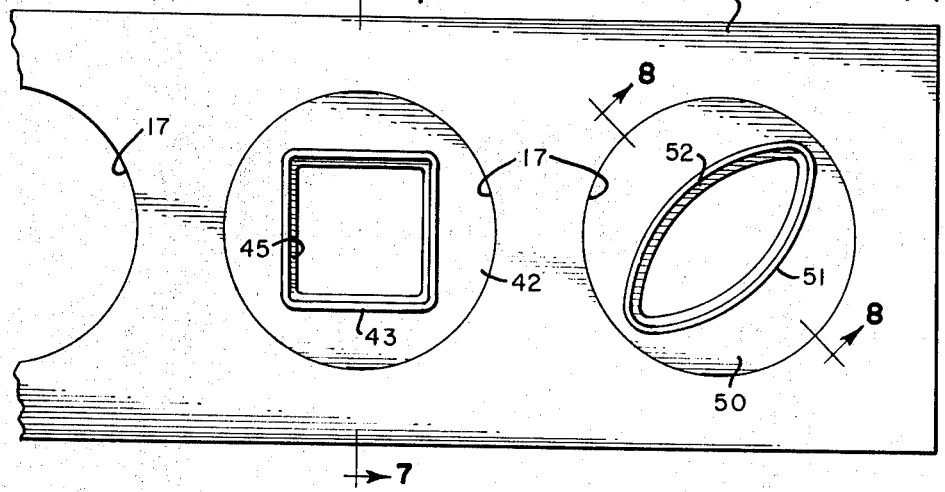
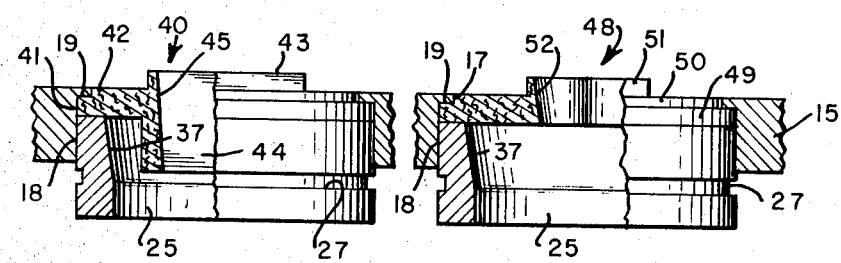

3,538,997

ENDLESS CONVEYOR FLIGHT WITH REPLACEABLE HOLDERS

BACKGROUND OF THE INVENTION

1. Field of the Invention

The present invention relates generally to endless conveyors of various kinds and relates particularly to articulate endless conveyors having a series of openings therein for the reception of containers to be filled by associated packing mechanism.

2. Description of the Prior Art

Generally the field of endless conveyors is a particularly well worked art and includes flexible as well as semirigid conveyor belts for moving articles from one place to another. In some cases the conveyor belts have had generally solid nonflexible flights which have had openings or recesses therein for the reception of articles being conveyed. Some efforts have been made to provide the openings with replaceable article holders or containers, however, these prior devices have been bulky, expensive, difficult to make and maintain and have been located in inaccessible positions and for other reasons have not been satisfactory.

SUMMARY OF THE INVENTION

The present invention is an endless conveyor having a plurality of rigid flights arranged in side by side relation and connected together by endless chains or the like at each end. Each of the flights has a plurality of openings extending entirely therethrough and each of such openings is adapted to receive a replaceable holder which can be fixed in position in a minimum of time and with minimum effort but which can be easily removed and exchanged with other holders when desired or required. Each of the holders may have one or more portions which are thermally nonconductive so that a lid or top can be sealed on the container after a predetermined quantity of food product has been placed within the container.

It is an object of the invention to provide a flight for an endless conveyor with such flight having a plurality of openings, each of which may replaceably receive a holder into which a food product or other article is adapted to be placed and thereafter a top or lid can be sealed on the container to maintain the contents air tight.

Another object of the invention is to provide a flight for an endless conveyor with openings therethrough of a size to receive replaceable holders as well as a series of interchangeable holders having varied configurations for receiving and supporting containers of various shapes and sizes.

BRIEF DESCRIPTION OF THE DRAWINGS

FIG. 1 is a fragmentary perspective illustrating a portion of a conveyor chain having a plurality of flights with multiple holders carried by each flight.

FIG. 2 is an enlarged fragmentary section taken on the line 2–2 of FIG. 1.

FIG. 3 is a section on the line 3–3 of FIG. 2.

FIG. 4 is a section on the line 4–4 of FIG. 3.

FIG. 5 is an exploded section of the flight and holder per se.

FIG. 6 is a fragmentary top plan view of a flight and illustrating two modified forms of holder.

FIG. 7 is a section on the line 7–7 of FIG. 6 and

FIG. 8 is a section on the line 8–8 of FIG. 6.

DESCRIPTION OF THE PREFERRED EMBODIMENTS

With continued reference to the drawings, an endless conveyor indicated generally at 10 is provided and such conveyor includes a pair of generally parallel endless chains 11. The chains normally extend in a loop around two or more sprockets (not shown), at least one of which is driven in any conventional manner. Certain links of each of the chains 11 includes an angle support member 12 having an upstanding leg 13 secured to the chain 11 in any desired manner and an outwardly extending leg 14 projecting toward the opposite chain. The angle members 12 of each chain are in equal spaced relation to each other and in opposed relation with the members of the other chain.

Between the chains 11 a plurality of flights 15 of metal or other generally rigid material are disposed in parallel relation with each other and with each flight being spaced slightly from the adjacent flights. The end of each flight rest on opposed outwardly extending legs 14 of the angle members 12 and are adapted to be connected thereto in any desired manner as by screws or other fasteners 16 so that each flight is fixed at each end to the parallel chains 11.

Each of the flights 15 has a plurality of spaced openings 17 extending entirely therethrough with each opening having a counterbore 18 from one side providing a shoulder 19. A plurality of thermally nonconductive container holders 22 are provided having a generally cylindrical base portion 23 of a diameter slightly less than the diameter of the counterbore 18 and greater than the diameter of the opening 17 are provided. Each holder has a reduced upstanding portion 24 of a diameter less than the diameter of the openings 17. The holders are adapted to be inserted through the counterbores 18 until the base portion 23 is in engagement with the shoulder 19 and with the reduced upstanding portions 24 extending through the openings 17.

In order to mount the holders in a fixed position a generally cylindrical support member 25 is provided having an outer diameter of a size to be received within the counterbores 18, and such support member has an upper surface 26 adapted to engage the base portion 23 of the holders 22. The support member 25 extends downwardly below the lower surface of the flight 15 and is provided with an annular recess 27 located exteriorly of such flight. The support members 25 are adapted to be locked in position by intermediate anchor plates 28 located between adjacent support members and a pair of end anchor plates 29, two of which are connected to each of the end support members 25 as illustrated in FIG. 3. Each of the anchor plates 28 and 29 is provided with a central opening 30 for the reception of a threaded fastener 31 threadedly received within openings 32 in the flight 15. The intermediate anchor plates 28 are received within the annular recesses 27 of a pair of adjacent support members 25 and will force the base portion 23 of the holders against the shoulder 19 when the fasteners 31 are tightened. Since only one end of the end anchor plates 29 are received within the recesses 27, the opposite end of each of such plates include an upwardly turned lip 33 adapted to engage the flight 15 as illustrated in FIG. 4.

In order to receive a container or cup 35 shown in phantom lines in FIG. 2 the holders 22 include a bore 36 of a size and configuration corresponding generally to the exterior size and configuration of the container 35. As illustrated in FIGS. 2, 4 and 5, the container is tapered and accordingly the bore 36 is likewise tapered a corresponding amount. Since the container 35 is of greater depth than the thickness of the holders 22 the support member 25 is provided with a bore 37 which may be tapered to correspond to the taper of the bore 36 of the holder. Preferably the holders 22 are constructed of thermo insulating material so that a top or cover (not shown) can be sealed on the container 35 by heat without adversely affecting either the holders 22 or the flights 15.

With reference to FIGS. 6—8, modifed forms of holders are provided for accommodating containers of various configurations. In FIG. 7, a container holder 40 is provided having a base portion 41 and a reduced upper portion 42. The upper surface of which is generally coextensive with the upper of the flight 15. In this modification the holder has an upstanding portion 43 and a downwardly extending portion 44 with a tapered bore 45 defining a generally square opening for receiving a container which is generally square in cross section and which has less capacity than the container 35. In this modification the support member 25 is utilized to retain the base 41 of the holder 40 against the shoulder 19 of the flight.

With reference to FIG. 8, a further modified form of the invention is provided including a container holder 48 having a base portion 49 and a reduced upper portion 50, the upper surface of which is generally coextensive with the upper surface of the flight 15. An elliptical-shaped upstanding portion 51 is provided having a tapered bore 52 of a size to accommodate a container which is oval in cross section. In this modification the support member 25 is adapted to retain the base portion 49 of the holder 48 against the shoulder 19 of the flight.

In the operation of the device the endless conveyor 10 normally has upper and lower runs arranged in such a manner that containers are placed within the containers carried by the container holders 22, 40 and 48 at one end of the upper run and thereafter the containers are filled by any well-known packaging mechanism. Usually a top is placed on the container and sealed by heat or otherwise after which the containers are discharged from the conveyor at the opposite end of the upper run.

If it is desired to change all of the container holders, it is possible to remove the entire flight by removing the screws 16 after which the flight can be taken off of the angle member 12 and a new flight substituted therefor. If it is desired to replace one or more holders, the machine is stopped with the holder to be replaced located on the lower run so that the threaded fasteners 31 are easily accessible and thereafter the threaded fasteners holding the anchor plates that are in engagement with the support member of the holder to be replaced or removed and thereafter the support member 25 can easily be extracted and the holder can be removed through the counterbore 18. After the holder is removed another holder is placed within the counterbore with the base portion thereof in engagement with the shoulder 19 after which the support member and the anchor plates are replaced.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. The combination of a replaceable holder and an endless conveyor flight having an opening and a concentric counterbore providing a shoulder, said holder comprising a base portion receivable within the counterbore of said flight and in engagement with said shoulder, a reduced upper portion extending through the opening of said flight, said holder having an opening of a size and configuration to receive and support a container, a support member engageable with said base portion, anchor plate means for engagement with said support member in spaced relation to said flight and fastening means carried by said anchor plate means and engageable with said flight for applying pressure to said support member and said base portion to maintain said holder in fixed position.

2. The structure of claim 1, including a plurality of holders having base portions of a size to be received within said counterbore and having container receiving openings of various sizes and configurations.

3. The combination of an endless conveyor flight and a plurality of replaceable container holders, said flight including an elongated member having a plurality of spaced openings extending entirely through the same and with each opening having a generally concentric counterbore providing a shoulder, each of said holders including a base portion of a size to be received within said counterbore and in engagement with said shoulder, each holder having an upper reduced portion extending through the opening of the flight conveyor, a support member receivable within said counterbore and engageable with said base portion, each of said support members having a recess located exteriorly of said flight, anchor plate means having one end received within said recess, and fastening means for connecting said anchor plate means to said flight in a manner to hold said support member and said holder in fixed position.

4. The structure of claim 3 in which said holders have upstanding portions with openings therein for the reception of containers having various sizes and configurations.